United States Patent [19]

Mazumder

[11] Patent Number: 5,014,324
[45] Date of Patent: May 7, 1991

[54] MICR CHARACTER READER USING MAGNETIC PEAKS TO UPDATE TIMING CLOCKS

[75] Inventor: Ali T. Mazumder, Waterloo, Canada

[73] Assignee: NCR Corporation, Dayton, Ohio

[21] Appl. No.: 202,849

[22] Filed: Jun. 6, 1988

Related U.S. Application Data

[63] Continuation-in-part of Ser. No. 136,069, Dec. 21, 1987.

[51] Int. Cl.$^5$ .......................... G06K 9/00; G06K 7/08; G06K 19/06
[52] U.S. Cl. .......................................... 382/7; 382/64; 235/449; 235/493
[58] Field of Search ................ 382/7, 12, 64; 235/449, 235/493

[56] References Cited

U.S. PATENT DOCUMENTS

| | | | |
|---|---|---|---|
| 3,316,536 | 4/1967 | Andrews et al. | 340/146.3 |
| 3,528,058 | 9/1970 | Bond | 340/146.3 |
| 3,629,829 | 12/1971 | Ordower | 340/146.3 |
| 3,914,789 | 10/1975 | Coker, Jr. et al. | 235/449 |
| 3,987,411 | 10/1976 | Kruklitis et al. | 340/146.3 |
| 4,088,879 | 5/1978 | Banka et al. | 235/449 |
| 4,143,355 | 3/1979 | MacIntyre | 340/146.3 |
| 4,245,211 | 1/1981 | Kao | 340/146.3 |
| 4,380,734 | 4/1983 | Allerton | 324/225 |
| 4,628,194 | 12/1986 | Dobbins et al. | 235/379 |

Primary Examiner—Leo H. Boudreau
Assistant Examiner—Michael Commarata
Attorney, Agent, or Firm—Wilbert Hawk, Jr.; Albert L. Sessler, Jr.; Elmer Wargo

[57] ABSTRACT

An apparatus for use in reading magnetic waveforms, like E13B, which are printed on a carrier like financial documents or checks. The waveforms include positive and negative peak values and substantially zero values occurring at predetermined times for a predetermined character. A shaft encoder is used to develop a nominal count which is correlated to the velocity of the carrier. Teh nominal count is used to generate a timing clock which is used to clock the positive and negative peak values and substantially zero values into registers for subsequent character recognition. The occurrence of the timing clock is adjusted by utilizing the occurrence of a positive or negative peak itself.

5 Claims, 11 Drawing Sheets

MICR CHARACTER READER USING MAGNETIC PEAKS TO UPDATE TIMING CLOCKS

CROSS-REFERENCE TO RELATED APPLICATIONS

This invention is a continuation in part of U.S. application Ser. No. 136,069 which was filed on Dec. 21, 1987 and which is assigned to the same assignee as is this application.

BACKGROUND OF THE INVENTION

This invention relates to an apparatus for use in reading magnetic character waveforms, like E13B, which are imprinted on documents, like checks, even though there is a variation in the speed of the document as it is moved past the associated read head in the apparatus.

In some prior art MICR (Magnetic Ink Character Recognition) readers, it is common to use an expensive, constant velocity motor to move the document at a constant velocity past the associated read head within the apparatus. With a constant speed, the anticipated positive magnetic peaks, negative peaks, and lack of peaks appear within the designated "windows" for the character being read, providing an accurate reading of the character. When the speed of the document changes for various reasons, the magnetic peaks read may not fall within the anticipated windows or time slots, causing the character to be misread.

Another prior art technique of adjusting to variations in the speed of the document as it passes the associated read head is to adjust the width of the examining "window" to enable an anticipated magnetic peak to fall within the anticipated window.

SUMMARY OF THE INVENTION

The purpose of this invention is to develop an apparatus for use in a reader which is able to read MICR data on a document even though there is a variation in the speed of the document as it is moved past the reader.

This invention utilizes a shaft encoder to provide a nominal count which is correlated to the velocity of the carrier or document on which the characters are located, and it also uses the positive and negative peak values of the character waveform itself to update the timing clocks which are associated with the nominal clocks.

In a preferred embodiment of this invention, there is provided an apparatus for use in reading MICR characters on a carrier, with each said character having a waveform which starts with a positive peak value, and with the waveforms of said characters being comprised of predetermined patterns of positive peak values, negative peak values, and substantially zero values occurring at predetermined clocking periods to identify a particular waveform as representing a particular character; said system comprising: data register means for storing said positive peak values, negative peak values and substantially zero values when clocked therein; a clocking circuit for clocking said positive peak, negative peak, and substantially zero values into said data register means at times corresponding substantially to the times of the occurrences of said positive peak, negative peak and said substantially zero values; said clocking circuit having: first means including a shaft encoder for generating a nominal clocking signal for each of said positive peak, negative peak, and substantially zero values; and second means for utilizing a positive peak value or a negative peak value itself for adjusting the occurrence of an associated said nominal clocking signal to generate an adjusted clocking signal which is used to clock the associated said positive or negative peak value into said data register means.

An advantage of the invention is that it is economical to manufacture.

Another advantage is that it can use an inexpensive motor in the shaft encoder, and yet it provides for accurate reading of the magnetic data waveforms.

These advantages and others will be more readily understood in connection with the following specification, claims and drawing.

BRIEF DESCRIPTION OF THE DRAWING

FIGS. 4A-1, 4A-2, 4A-3, and 4A-4, included on the sheet containing FIG. 4A, show additional details of the read circuit;

DETAILED DESCRIPTION OF THE INVENTION

Figure 1:
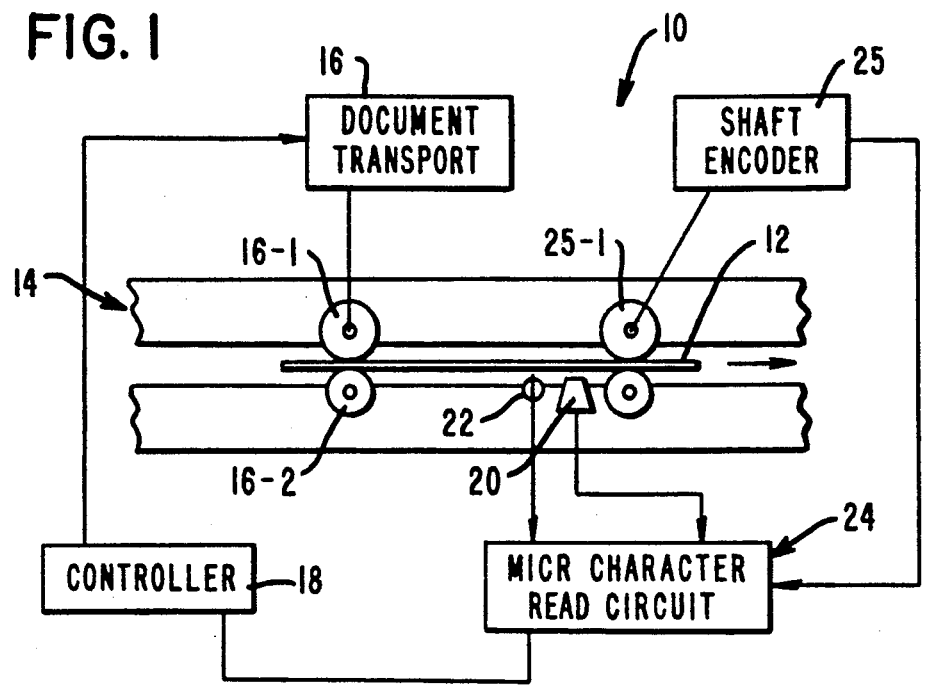
FIG. 1 is a general schematic plan view of the apparatus of this invention.

As stated earlier herein, one of the purposes of this invention is to read MICR data on a document even though there is some variation in the speed of the document as it is moved past the associated read head. In this regard, FIG. 1 shows a typical environment or apparatus 10 in which this invention may be used. In the banking or financial systems, certain data is printed on documents in magnetic ink; this data is referred to as MICR data, and it generally appears near the bottom of the documents, like checks, for example.

When the MICR data is to be read, the carrier or document 12, carrying the data, is moved in a document track 14 by a document transport 16 which includes rollers 16-1 and 16-2, with the document transport 16 being under the control of a controller 18. As shown in FIG. 1, the top edge of the document is visible, with the bottom edge of the document 12 gliding over the bottom of the document track 14. A read head 20 is positioned in the track 14 so as to be in reading relationship with the MICR data on the document 12 as it is moved past the read head 20.

Prior to the document 12 reaching the read head 20, its leading edge encounters a document present sensor 22. The output of the sensor 22 is coupled to a MICR character read circuit which is designated generally as circuit 24; this circuit 24 is part of the apparatus 10. The apparatus 10 also includes a conventional shaft encoder 25 whose output is also coupled to the circuit 24. The encoder 25 is coupled to the shaft which rotates the drive wheel 25-1, which, in turn, moves the document 12 past the read head 20. The encoder 25 is designed to produce a pulse for every 0.0125 inch of document travel; the significance of this relationship will be described hereinafter.

Before describing the apparatus 10 in more detail, it appears appropriate to discuss the characteristics of the waveforms generated when the MICR data is moved in operative relationship with the read head 20. In the embodiment described, the waveforms to be discussed are associated with E13B characters, although the principles of this invention may be extended to the reading of magnetic waveforms other than the E13B mentioned.

Figure 2:
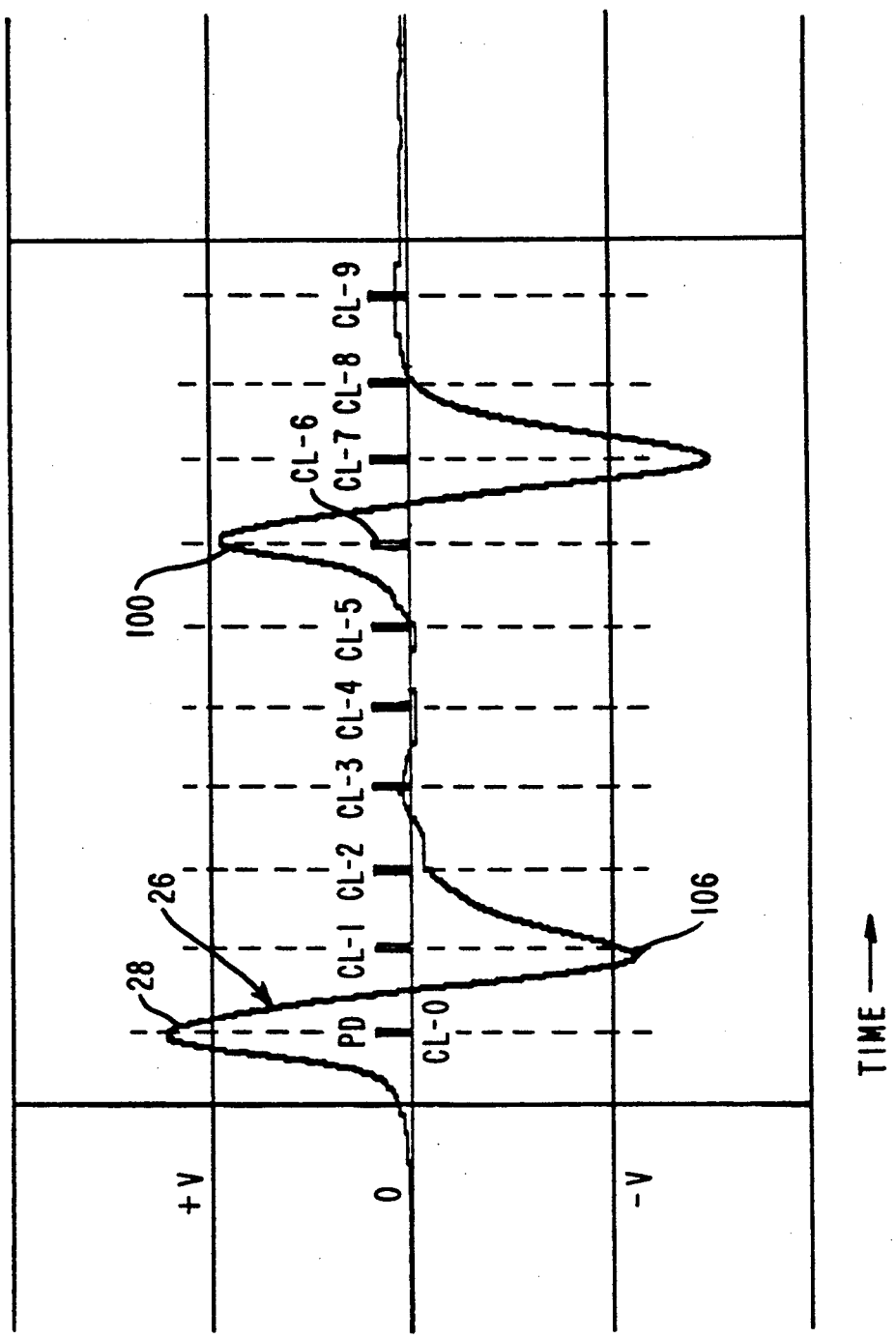
FIG. 2 is a waveform of a MICR character which is read by the apparatus of this invention.

Some of the characteristics of E13B characters are as follows. The character pitch according to ABA standards is 0.125 inch; that is, it is 0.125 inch from the start of one character to the start of the next character. The shaft encoder 25 produces one pulse for every 0.0125 inch of document travel, or, another way of stating the relationship is that the shaft encoder 25 produces 10 clocks for each character pitch. Within this 0.125 inch, there are eight cells or equally-spaced windows which are used to examine the magnetic waveform for an associated character. In this regard, a magnetic waveform may have positive peaks, negative peaks, and no peaks or substantially zero values which are located in the cells in predetermined patterns so as to be indicative of a particular character within the system. Another point is that each character always starts with a positive going peak in the first cell or window. FIG. 2 shows a magnetic waveform 26 for the number zero. Notice that the character starts with a positive going peak 28.

Whenever there is relative motion between the magnetized MICR characters on the document 12 and the read head 20, a voltage which is proportional to the rate of change of magnetic flux is generated. For the correct MICR recognition of a character, it is necessary that peaks within the waveform be identified and located properly. Whenever the speed of the document varies, the peaks in the associated waveform which is developed may not fall within the proper windows or cells of the waveform; consequently, an error in reading may result. The present invention provides a unique way of recognizing MICR characters by which instantaneous changes in the speed of the document moving past the read head 20 will have no effect on reading characters accurately.

FIG. 2 also illustrates certain factors associated with this invention. As stated earlier herein, this figure shows the magnetic waveform of the number 0. There are ten clock pulses generated for a character pitch which is 0.125 inch; these ten pulses are marked as CL-0 through CL-9. The first clock pulse starts with the generation of the first positive peak 28; this first clock is marked CL-0. After detecting the first positive peak 28 (FIG. 2), a clock pulse is developed every 0.0125 inch of document travel to represent the next peak position (if any); however, if an actual peak is detected, the position of the next clock is adjusted to the speed derived from the detected peak. Thus, the system follows the motion or speed of the MICR characters rather than the speed of the document. This aspect will become clearer after a discussion of the read circuit 24.

Figure 3:
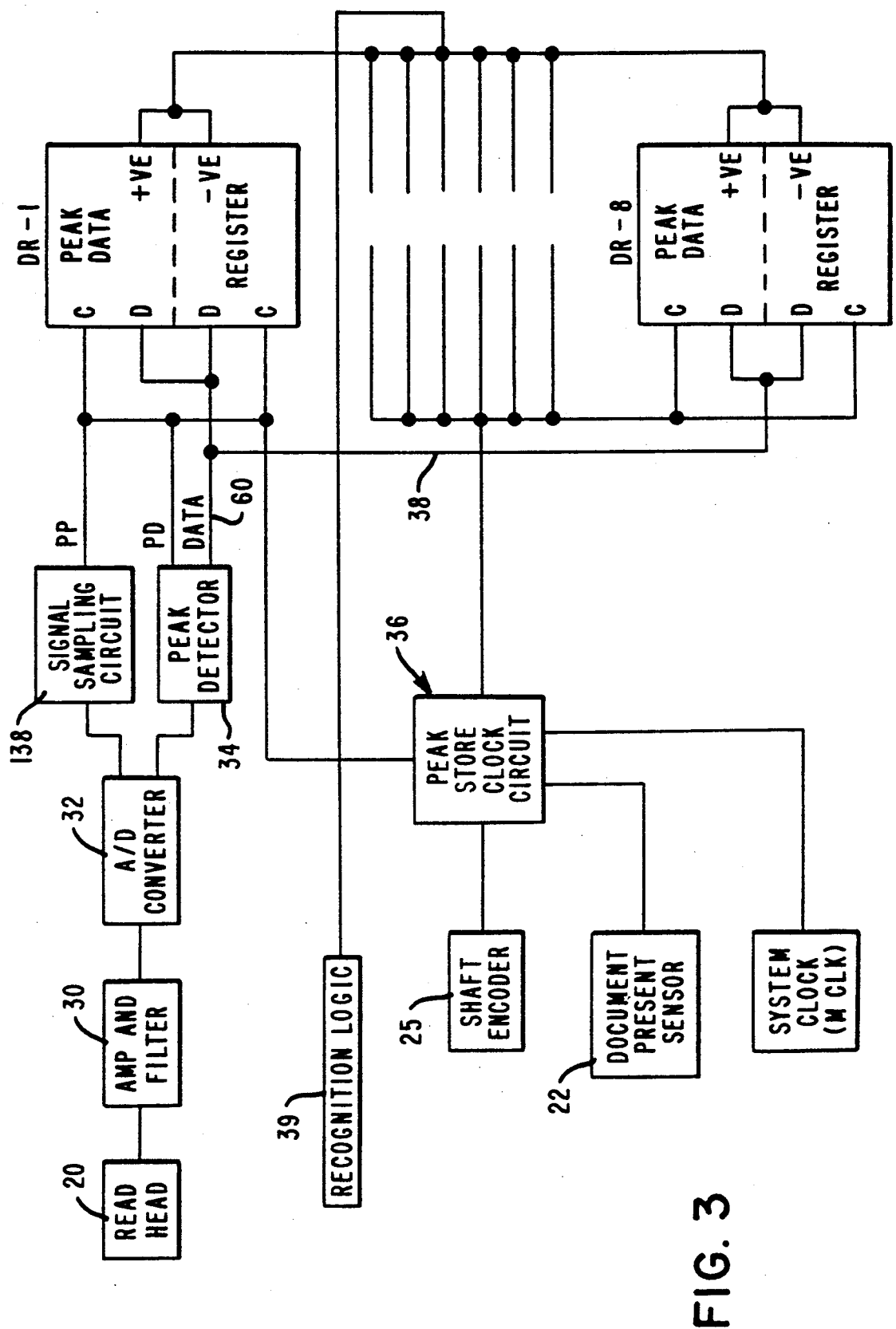
FIG. 3 shows a general overall schematic view of the read circuit shown in FIG. 1.

The read circuit 24 is shown in more detail in FIG. 3. The output of the read head 20 is amplified and filtered in circuit 30, and the output of circuit 30 is fed into an A/D converter 32 which produces a binary output which is clocked into one of the data storage registers DR-1 through DR-8 as will be described hereinafter. The output of the A/D converter 32 passes through a peak detector 34 associated with it. The output of the peak detector 34 is fed into a peak store clock circuit 36 which also receives the system clock (M clock), the document present signal from sensor 22, and the pulses from the shaft encoder 25. In general, the peak store clock circuit 36 is used to clock data coming from the A/D converter 32 and the peak detector 34 into the data storage registers DR1 through DR-8. The data coming from the A/D converter 32 is made available to each of the data storage registers DR-1 through DR-8 over conductors or lines shown as line 38. Notice that the data storage registers DR-1 through DR-8 store both positive and negative data for the positive and negative-going peaks which are anticipated in the system. The signal sampling circuit 138 is used to determine whether the data from the A/D converter 32 is a positive value, negative value, or essentially a substantially zero value. These aspects and the remaining portion of the circuit shown in FIG. 3 will be discussed hereinafter.

Figure 4A:
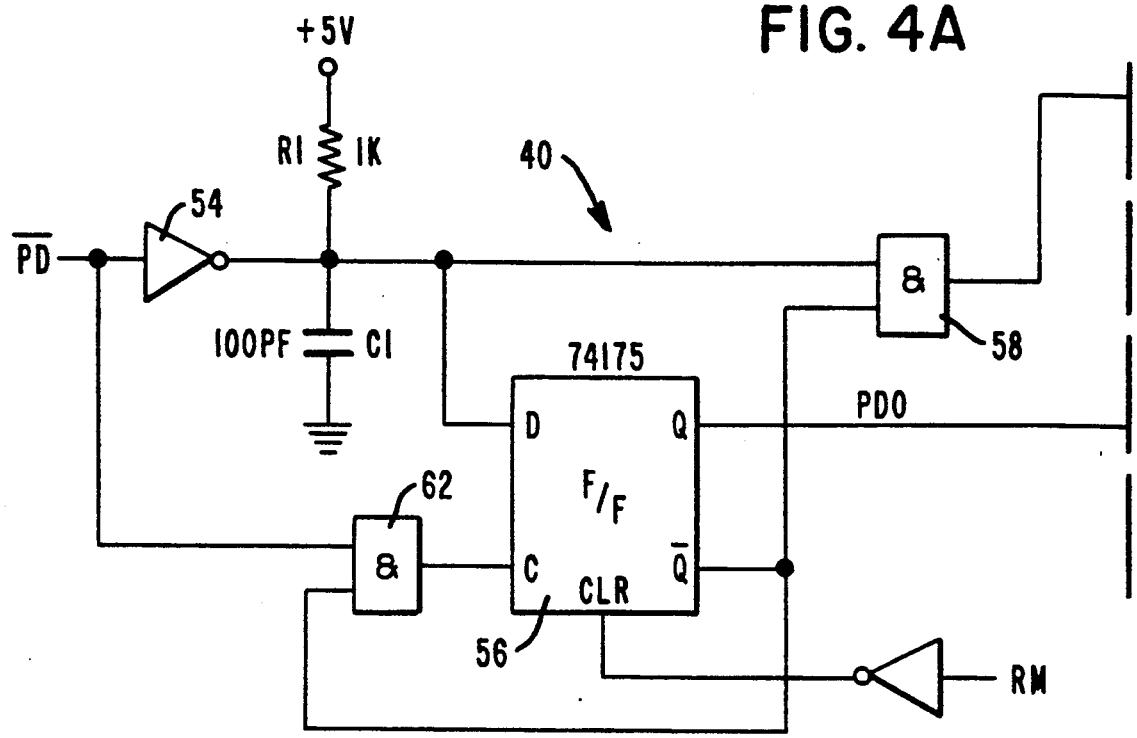
FIGS. 4A and 4B, taken together, show a portion of the read circuit shown in FIG. 1.
Figures 1, 4A:
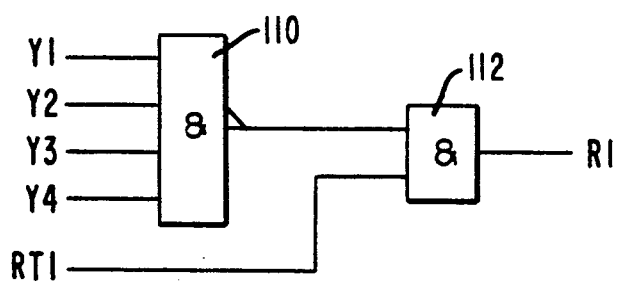
Figures 2, 4A:
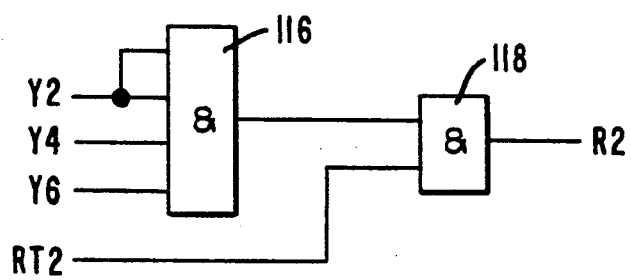
Figures 3, 4A:
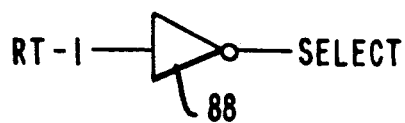
Figures 4, 4A:
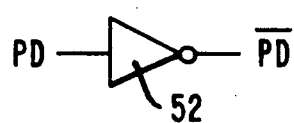
Figure 4B:
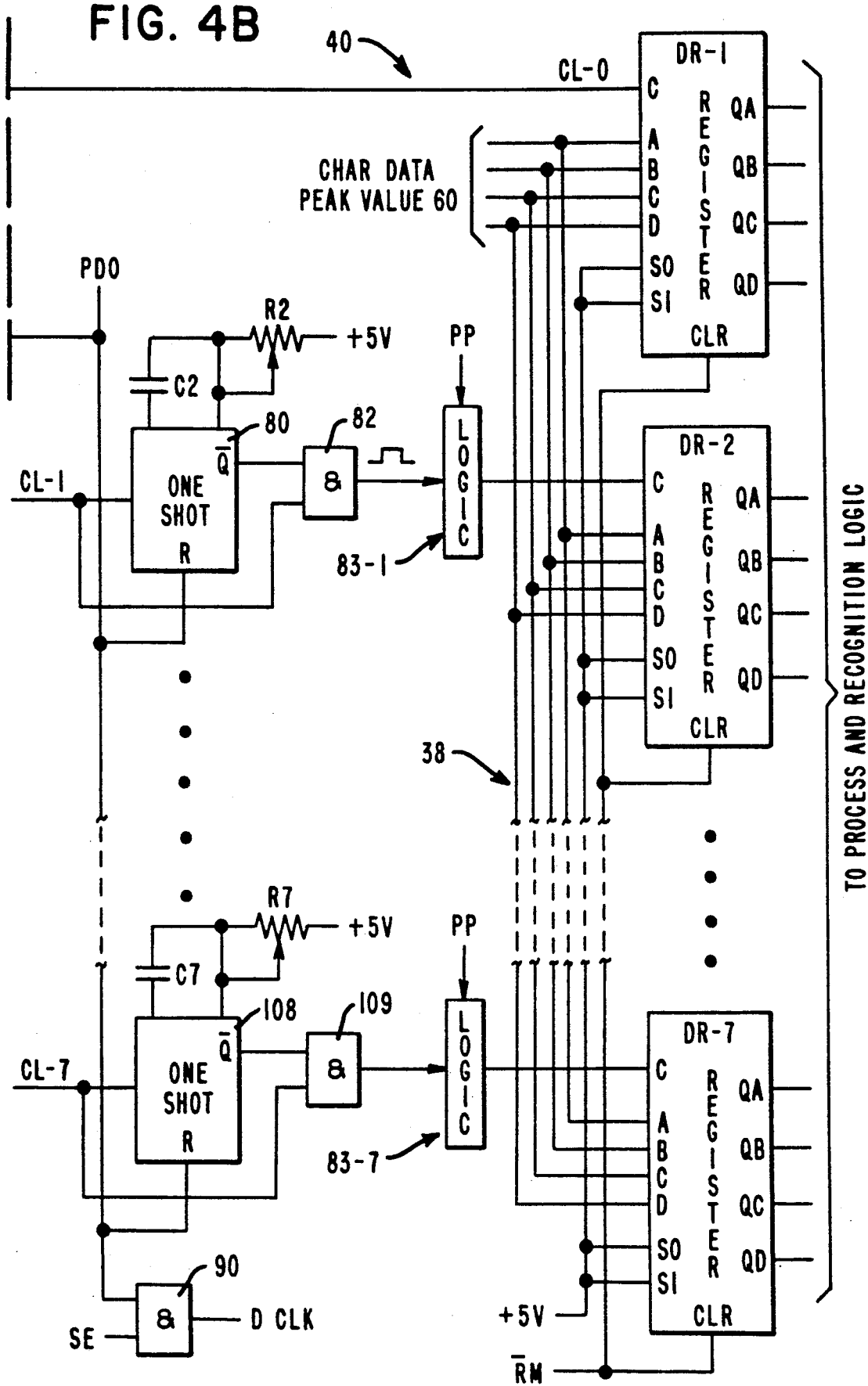

A portion of the peak store clock circuit 36 shown in FIG. 3 is designated as circuit portion 40 and is shown in FIGS. 4A and 4B. In order to describe this circuit portion 40, it is convenient to describe it generally in relation to processing a document 12, and thereafter, the specific details of clocking and control signals for the various major components will be given.

One of the problems of prior art systems of reading MICR data on documents was that it was difficult and expensive to maintain the speed of the document at a constant velocity while reading the MICR data. Even in those prior art systems which used a shaft encoder to sense changes in the speed of the document, it was possible for errors in reading to result. For example, suppose that there was some slip developed between the document being moved and the drive roller which drove it. The shaft encoder which was coupled to the drive roller would indicate that there was movement of the document; however, in fact, the document would not have moved. Because the shaft encoder indicated movement, the output of the shaft encoder would be used to produce a clocking signal for clocking the "expected peak" into appropriate storage registers for a subsequent character recognition operation. However, the "expected peak" would not be located at the associated read head, and consequently, this peak would be missed, and a misread would result.

In contrast with the reading problem mentioned in the previous paragraph, this invention utilizes the magnetic peaks themselves from reading a waveform for the updating or adjusting of the clocks which are used to clock or strobe the peak data on the associated data lines into storage registers. The present invention uses a shaft encoder to obtain a nominal velocity of the carrier or document; however, to repeat, the actual magnetic peaks are used to adjust the clocks, when necessary. The adjusted clocks are then used to strobe the positive peak values, negative peak values, and substantially zero values on the data lines into the storage registers.

In the embodiment described, E13B font MICR characters are read; however, the principles of this invention may be extended to other magnetic waveforms. As seen from FIG. 2, the first peak in E13B font is always a positive going peak, and clock CL-0 is used to strobe this peak data into storage or data register DR-1 shown in FIG. 4B. Clocks CL-1 through CL-7 are used to strobe the remaining positive peak values, negative peak values, and substantially zero peak values into the data registers DR-2 through DR-8, respectively. Clock CL-8 relates to the end of a character and clock CL-9 simply provides intercharacter spacing; these two clocks are not important from a character recognition standpoint. Each data register DR-2 through DR-8 is capable of storing positive or negative values as shown in FIG. 3; however to simplify the drawing, only the data registers for storing positive values are shown in FIG. 4B. FIG. 10 will be used to describe how the positive and negative peak values and substantially zero peak values are handled. This aspect will be discussed later herein. With the data values in the data registers DR-1 through DR-8, these data values can be examined, conventionally, by recognition logic 39 to determine the character represented by the associated magnetic waveform.

The reading of MICR data on a document 12 is started when the leading edge of the document reaches the sensor 22 located just ahead of the read head 20 as shown in FIG. 1. In this situation, the sensor 22 issues a document present (DP) signal (FIG. 5A) which passes through the NAND gate 42 and OR gates 44 and 46 to reset the counters A-1, A-2, 48, and 50. Counters A-1 and A-2 are used, alternately, to obtain a count which reflects the nominal velocity of the carrier or document 12 as it moves in reading relationship with the read head 20. Counter 48 is used to start and stop the counting by counter A-1, as will be described hereinafter, and counter 50 is used, similarly, with counter A-2. While the counters A-1 and A-2 are enabled, their outputs are not utilized until after a first positive going peak from a character being read is obtained.

As the document 12 is moved in the document track 14, the read head 20 encounters the first positive going peak (PD) for the first character to be read. The peak detect signal comes from the peak detector 34 (FIG. 3), and it is inverted, as shown by inverter 52 in FIG. 4A-4, to produce the PD/ signal shown in FIG. 4A. The PD/ signal is opposite to the PD signal and is read as PD "Bar". The PD/ signal is inverted by the inverter 54 and is fed into the flip flop 56. The output from the inverter 54 is also fed through the AND gate 58 to clock (CL-0) or strobe the data on the data lines 60 into the data register DR-1. Notice that the data lines 60 coming from the peak detector 34, shown in FIG. 3, are fed into all the registers DR-1 through DR-8; however, at this time, it is only the first register DR-1 which stores the data due to the PD signal being used to clock the value of the positive peak into this register.

The first PD signal is also used to obtain a control signal PDO which remains at a high level during the reading of a single character. The PDO signal is derived from the Q output of the flip flop 56, and the Q output remains at this high level until the flip flop is reset by the master reset signal RM. The RM signal occurs at the end of reading each character. The function of the resistor R1, the capacitor C1, and the AND gate 62 will be discussed hereinafter; for the moment, it is sufficient to show how the first PD signal is used and how the PDO signal is derived.

The PDO signal is used to condition the AND gate 64 (FIG. 5A) to enable the Q counter to start upcounting master clock or M CLK pulses. These same M CLK pulses are fed into the A-1 and A-2 counters (FIG. 5A) under conditions to be later described herein. The shaft encoder 25 (FIG. 1), counters A-1 and A-2, the selectors 66 and 68, and the comparator 70 (FIG. 5B) are the principal components of a means for generating a first count which reflects the speed of the document 12 as it is moved in reading relationship with the read head 20. As a general explanation, the first count which is placed alternately on counters A1 and A-2 is fed into the P0–P7 inputs of the comparator 70. The remaining Q0–Q7 inputs of the comparator 70 are coupled to the Q1–Q7 outputs of the Q counter. When the rising output of the Q counter equals the first count which was placed on the P0–P7 inputs of the comparator 70, a P=Q or clock signal is generated at the output of the comparator 70. This P=Q signal will ultimately be used to clock a value on the data lines 60 (FIG. 4B) into the appropriate data storage register DR-2 through DR-8. In other words, the Q counter is part of a means for developing a nominal time period which is equivalent to the first count and also for generating a clock signal (P=Q) which is used (after some manipulation) for clocking data into the data registers DR2 through DR8.

As P=Q signals are generated, they are routed through an early peak circuit 72 (FIG. 5B), and then, they are fed into a counter 74. The A–D outputs of the counter 74 are fed into a decoder 76. If the P=Q signal discussed in the previous paragraph were the first one generated, the A output of the counter 74 would rise to a high level, indicating a count of one. Subsequently, the Y1 output of the decoder 76 would fall to a low level and be inverted by the inverter 78 to generate clock CL-1.

The clock CL-1 is fed into a one shot delay 80 shown in FIG. 4B. After a predetermined delay, the clock CL-1 passes through the AND gate 82 and the logic circuitry 83-1 (to be later described herein) and is used to clock the data value on the data lines 60 into data register DR-2 in the example being described. In essence, the one shot 80 (FIG. 4B) provides a slight delay to "catch" a positive or negative peak value which comes a little later than anticipated. Conversely, the early peak circuit 72 (FIG. 5B) is used to handle the processing of a positive or negative peak value which comes earlier than the anticipated or nominal value. These aspects will be discussed in more detail hereinafter.

Figure 6:
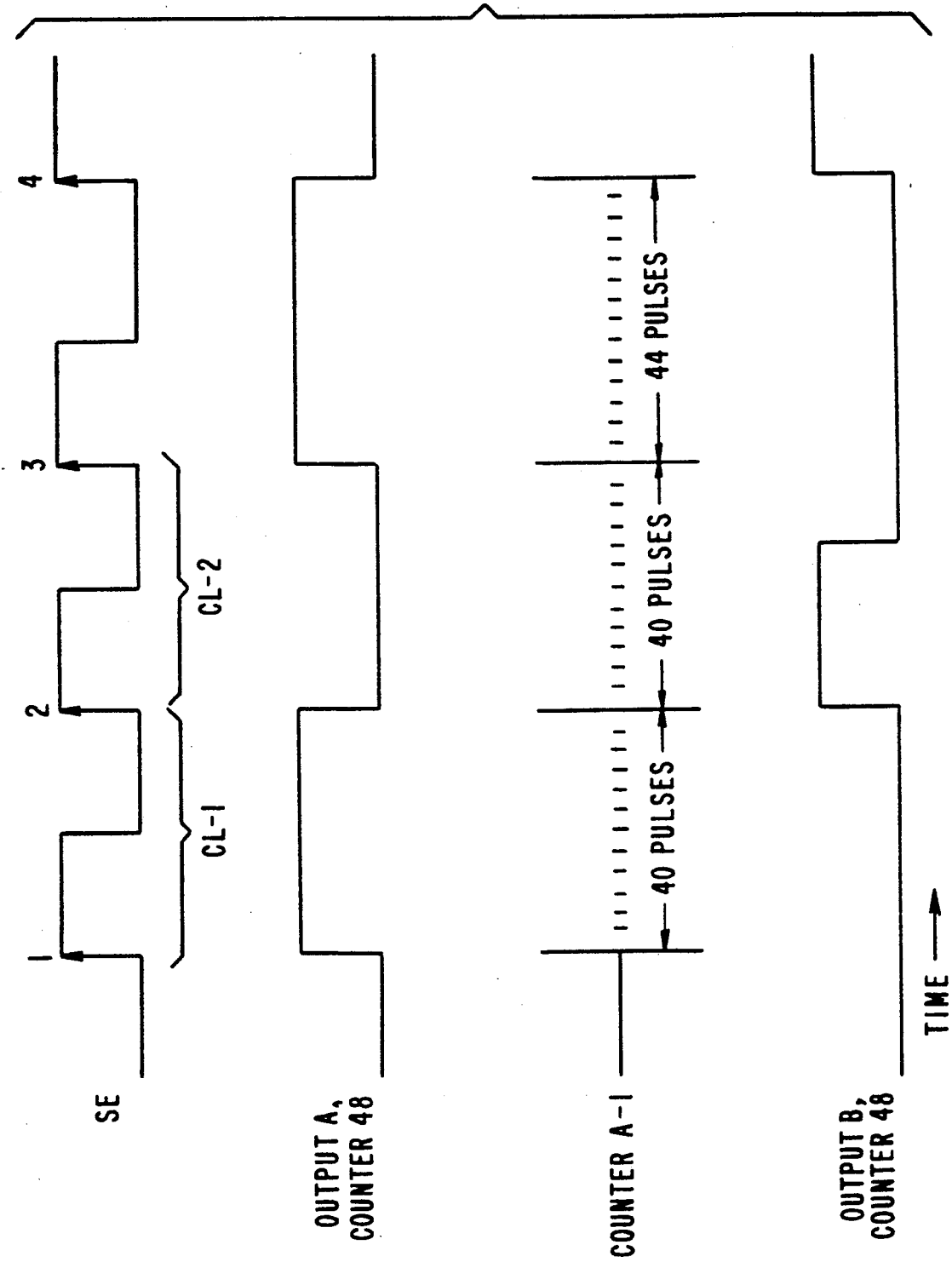
FIG. 6 shows certain waveforms associated with the circuit shown in FIG. 1.

Having described, generally, the operation of the read circuit 24, it seems appropriate to discuss the details of the circuit. In this regard, FIG. 6 shows the waveform output of the shaft encoder 25, which waveform consists of a plurality of SE pulses as shown. In the embodiment described, one such SE pulse occurs for each 0.0125 inch of document travel, and the document 12 moves past the read head 20 at a nominal speed of 100 inches per second.

In describing the operation, assume that the first positive going pulse has occurred as previously described. This means that the PDO signal (FIG. 5A), which is derived from the first PD signal, will remain at the high or active level for the duration of reading a character. The PDO signal conditions the Q counter to count only after the first positive peak has occurred; this means that the Q counter will begin to function to produce the P=Q pulses mentioned only after the reading of a character has begun.

Continuing with the reading of a character, the rise of the first SE pulse (FIG. 6) conditions the AND gate 84

(FIG. 5A) to permit the next M CLK pulse to reach the counter 48. Counter 48 is a binary 2 counter. After the first count is registered on the counter 48, its A output rises to a high level, indicating a count of "one." The high level at the A output of counter 48 conditions the AND gate 86, permitting the M CLK pulses to be counted by the A-1 counter. The A-1 counter continues to count pulses until the next pulse or SE pulse 2 from the shaft encoder 25 occurs. As an illustration, there may be 40 pulses counted by the A-1 counter between the occurrences of the first and second SE pulses as shown by the line marked counter A-1 in FIG. 6. The first count of 40 reflects the speed of the carrier or document 12 as it is moved past the read head 20.

Figure 5A:
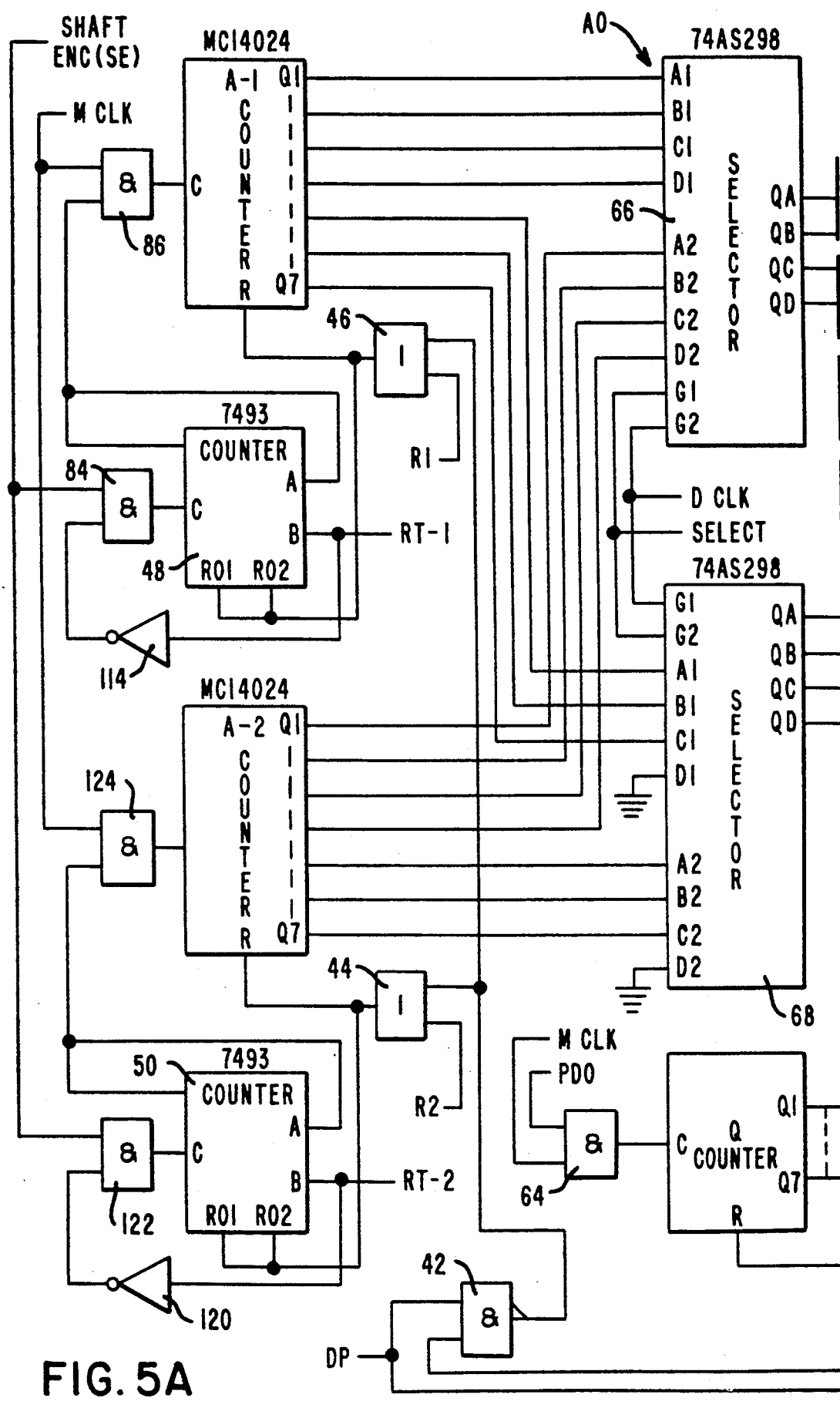
FIGS. 5A and 5B, taken together, show additional details of the read circuit shown in FIG. 1.

When the second SE pulse occurs, as discussed in the example described in the previous paragraph, a count of two is registered on the counter 48. This means that the A output of the counter 48 falls to a low level, and the B output thereof rises to a high level. A low level on the A output just mentioned stops the flow of M CLK pulses to the A-1 counter via the AND gate 86, leaving the first count of 40 thereon as discussed in the previous paragraph. The high level RT-1 output from the counter 48 is inverted by the inverter 88 (FIG. 4A-3) to produce a low level active Select signal which is fed into the G1 inputs of the selectors 66 and 68 (FIG. 5A). The selectors 66 and 68 are wired together to produce a composite selector which shall be referred to hereinafter as selector 66-68.

Figure 5B:
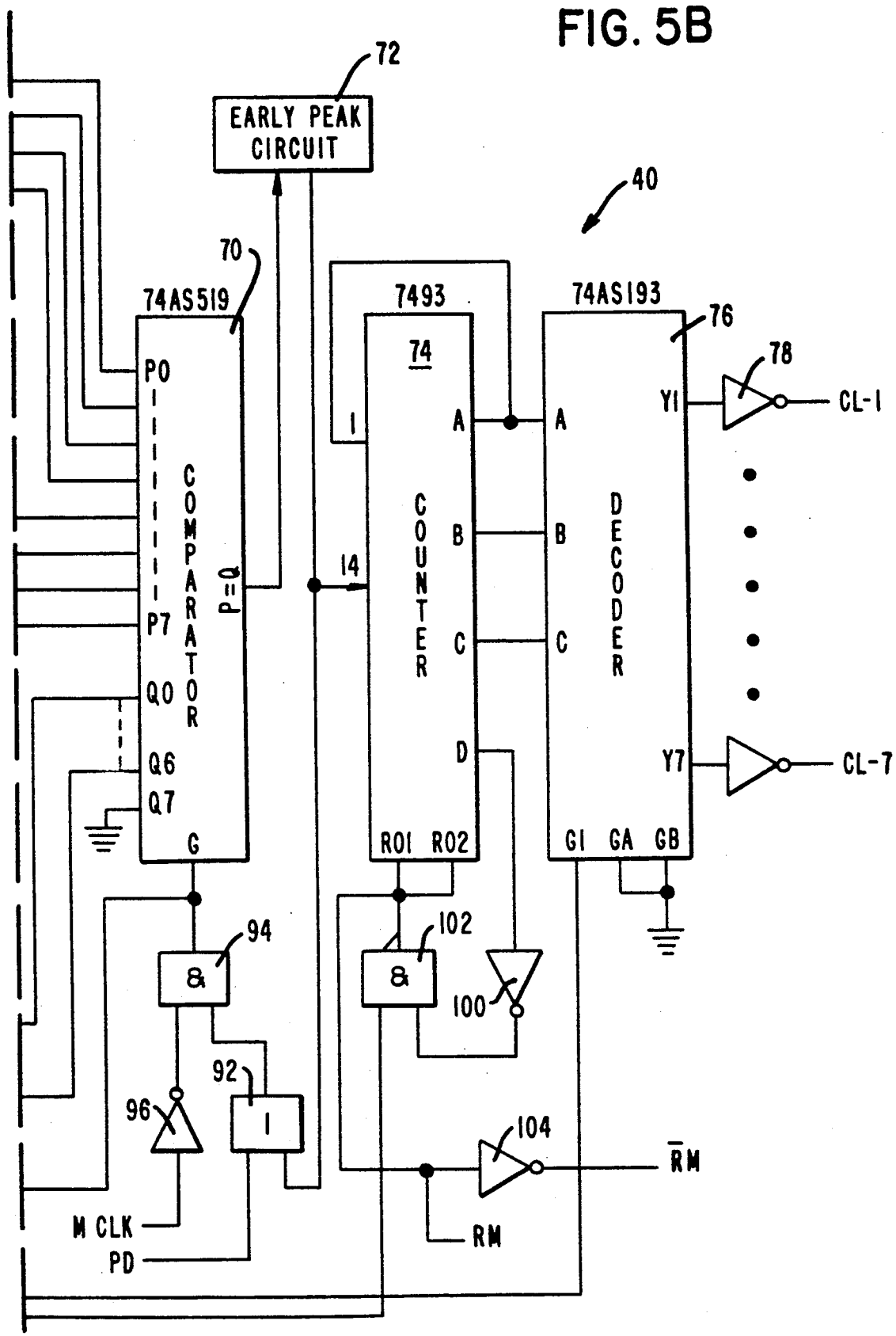

With the Select signal to selector 66-68 (FIG. 5B) at a low level, that data which is on its inputs A1 through D1 will be forwarded to the P0-P7 inputs of the comparator 70 (FIG. 5B). In this example being discussed, the data on the comparator 70 is the first count of 40 which was obtained from the A-1 counter. The data clock D CLK is used to clock the data into the selector 66-68. Notice from FIGS. 4A and 4B that the first positive going peak produces the PD0 signal already discussed. Notice also that the PD0 signal and the SE signal are fed through the AND gate 90 (FIG. 4B) to generate the D CLK signal. This means that data from the A-1 counter, for example, can be clocked into the selector 66-68 only after the first positive peak is detected, indicating the start of a new character.

Each time a peak is detected by the peak detector circuit 34, that signal is fed through the OR gate 92 (FIG. 5B) to the AND gate 94. When the next M CLK falls to a low level, this signal is inverted by the inverter 96 and sent to the conditioned AND gate 94, causing the Q counter (FIG. 5A) to be reset. The Q counter then counts the M CLK pulses on its input, and this count is forwarded to the Q0-Q6 inputs of the comparator 70. When the count on the Q counter reaches the first count of 40 which appears on the P0-P7 inputs of the comparator 70 in the example described, the comparator issues a P=Q signal. For the moment, it is sufficient to state that the P=Q signal passes through the OR gate 98 in the early peak circuit 72 (FIG. 8) and is fed into the counter 74. Because this is the first P=Q signal in the example described, the A output or "1" output of the counter 74 will rise to a high level.

The outputs of the counter 74 are coupled to the A, B, and C inputs of the decoder 76 as shown in FIG. 5B. A count of one on counter 74 corresponds to clock CL-1 coming from the Y1 output of decoder 76. Correspondingly, a count of 7 on the counter 74 corresponds to clock CL-7 coming from the Y7 output of the decoder 76. A count of eight coming from the D output of the counter 74 corresponds to clock CL-8 which is associated with the portion of a character waveform which is near zero and the end of a character as shown in FIG. 2. The D or 8th count from the counter 74 is inverted by the inverter 100 and fed into the NAND gate 102 to condition the counter 74 to start counting when the next character to be read is encountered. The 8th count from the counter 74 is also used to obtain a master reset RM from the output of NAND gate 102. The RM/ signal is obtained by passing the RM signal through the inverter 104.

Continuing with the example being discussed in the previous paragraph, assume that no peak data appeared on the data lines 60 at the exact time that the clock CL-1 was developed at the output of the decoder 76. In other words, suppose that the peak 106, shown in FIG. 2, came after the clock CL-1 was generated instead of having it occur at the time that clock CL-1 was generated as shown literally in FIG. 2. This would mean that no peak data would be on the data lines 60 when the clock CL-1 arrived, and a misread would result. In order to avoid a loss of data, a slight delay is introduced to the clock CL-1 by the one shot 80 (FIG. 4B) as previously discussed. A capacitor C2 and a variable resistor R2 are used to conventionally delay the clock CL-1 by about 50% of the nominal time between clocks. When the active high level clock CL-1 arrives at the one shot 80 (FIG. 4B), the Q/ output thereof switches to a low level, and at the end of the delayed period, the Q/ output switches to a high level. The high level from the Q/ output passes through AND gate 82 to clock the peak value data on data lines 60 into the DR-2 register in the example being described.

As previously stated, there is a data register, like register DR-2, for each of the remaining data values and their associated clocks CL-3 through CL-7, with only registers DR-1, DR-2, and DR-8 being shown in FIG. 4B to simplify the drawing. Similarly, there is a one shot and related components for the remaining clocks CL-2 through CL-7; however, only the one shot 108, AND gate 109, capacitor C7, and resistor R7 for clock CL-7 are shown. While only data registers are shown for storing the positive peaks in FIG. 4B, it should be recalled that there are data registers for storing the negative peaks as shown in FIG. 3. The positive and negative peaks are clocked into the appropriate portion of the data register as will be described hereinafter in conjunction with FIGS. 10A and 10B.

Figure 7:
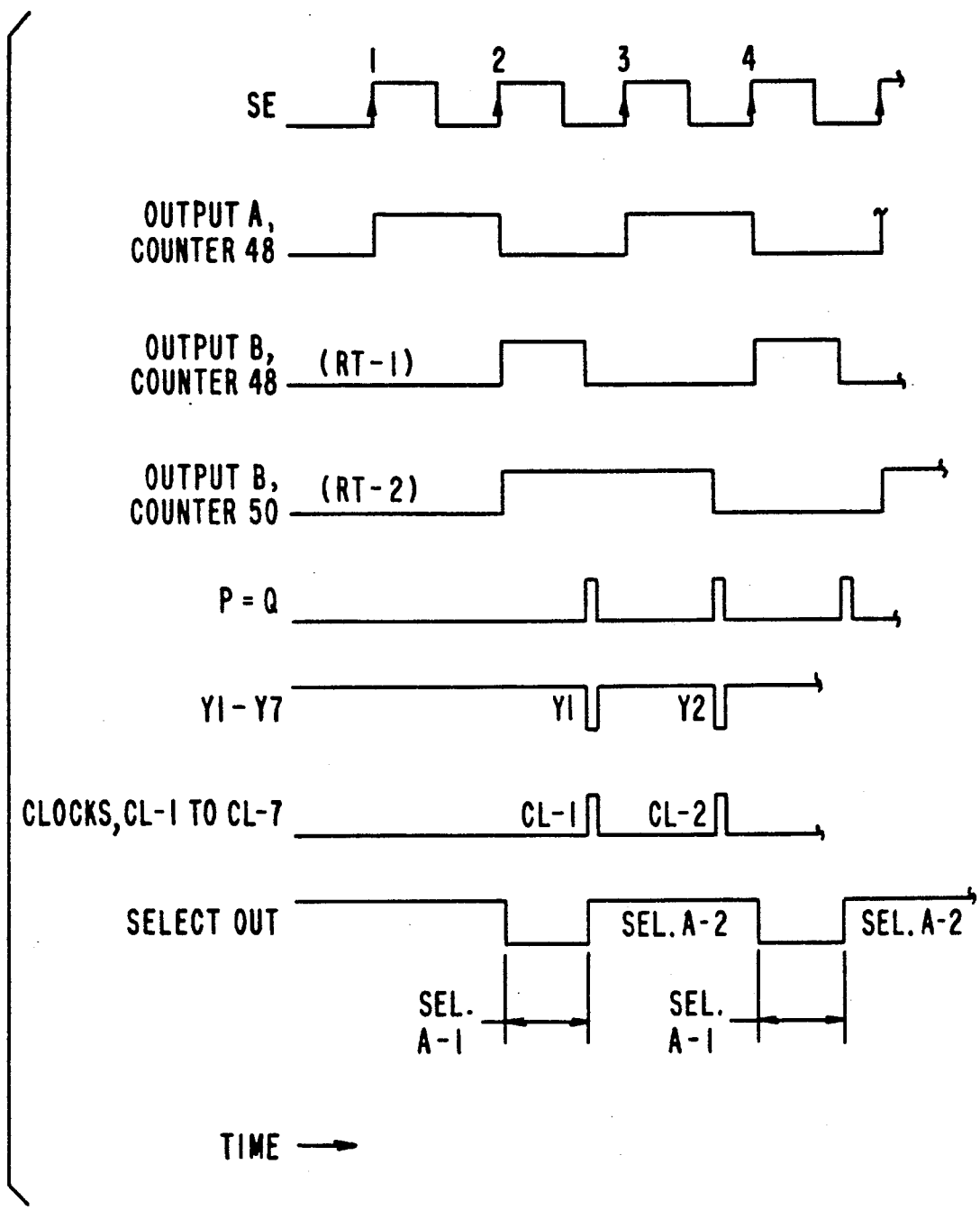
FIG. 7 shows certain waveforms associated with the portion of the circuit shown in FIGS. 5A and 5B.

To review some of the clocking and control pulses associated with the generation of the first clocking pulse CL-1 in the example being described, attention is directed to FIGS. 5A, 5B, 6, and 7. FIGS. 6 and 7 show various waveforms associated with the portion of the circuit shown in FIGS. 5A and 5B. It should be recalled that the first count associated with clock CL-1 accrues on the A-1 counter and the A-2 counter, with a count of 40 being shown on the A-1 counter in FIG. 6. Notice from FIG. 6 that a count occurs on the A-1 counter during the time that the A output of the associated counter 48 is at a high level, indicating a count of one. When the SE pulse 2 occurs, the B outputs of both counters 48 and 50 will rise to a high level. A high B output level at counter 48, passing through the inverter 88 in FIG. 4A-3, produces a low level select signal for selector 66-68 as previously described.

The low level select signal on selector 66-68 selects the data or count on the A-1 counter, and contrastingly, a high level select signal selects the data or count on the A-2 counter. Continuing with a discussion of the example described in the previous paragraph, the Y1 signal (active-low) from decoder 76 (FIG. 5 B) would be developed as previously described to produce clock C1-1. The Y1 signal and the remaining Y2-Y7 signals are used in controlling the selection of data from the A-1 and A-2 counters. At the time of the generation of Y1, the Y3, Y5, and Y7 outputs from decoder 76 are at an inactive or high level. These Y1, Y3, Y5, and Y7 outputs are fed into the NAND gate 110 shown in FIG. 4A-1, and because Y1 is at a low level, a high level output is generated by the NAND gate 110. This high level is fed into AND gate 112, which is already conditioned by the high level RT-1 output from the counter 48, to produce the R1 output from AND gate 112.

This newly developed R1 signal is fed into the OR gate 46 (FIG. 5A) to reset the A-1 counter and the associated counter 48. The B output of the counter 48 now falls to a low level, and this low level signal is fed through the inverter 114 to condition the AND gate 84. This permits the A-1 counter to start developing a new count which reflects the velocity of the document moving past the read head 20. At this time, the signal R2, which is fed into the OR gate 44 (FIG. 5B), is at a low level, and consequently, the A-2 counter and the counter 50 are not reset. This means that the count which is on the A-2 counter will be used as the nominal speed value or count for the development of clock CL-2.

Continuing with the example discussed in the previous paragraph, the R2 signal is at a low level because the Y2, Y4, and Y6 signals coming from the decoder 76 (FIG. 5B) are at a low level. These Y2, Y4, and Y6 signals are fed into the NAND gate 116 (FIG. 4A-2), resulting in the output from the NAND gate 116 and the output from the AND gate 118 (R2) being at a low level. The R2 signal remains at a low level until the generation of the Y2 signal which is developed from the second P=Q signal.

As a summary of the timing of the operation of the read circuit 24 as discussed in relation to FIG. 7, the following activities occur:

1. Shaft encoder signal SE rises to a high level.
2. The A-1 and A-2 counters start to accumulate the first count after being reset by the document present signal DP.
3. The counting on the A-1 and the A-2 counters terminates upon the occurrence of the next occurring SE.
4. The output B of counter 48 rises to a high level upon the occurrence of the SE signal discussed in the previous activity, selecting the count on the A-1 counter.
5. There may be several SE signals before the first positive going pulse PD is encountered.
6. The first positive going peak PD is detected, indicating the start of the first character to be read.
7. The PD signal is used to generate the PDO signal and to reset the Q counter.
8. The PDO signal and the next SE signal (SE 2 in FIG. 7) are used to generate the D CLK to clock the data or first count from the A-1 counter into the comparator 70.
9. The PDO signal also conditions the Q counter to start upcounting to the first count on the comparator 70.
10. The P=Q signal is issued from the comparator 70 when the count on the Q counter equals the first count.
11. The P=Q signal passes through the early peak circuit 72, the counter 74, and the decoder 76 to produce Y1 and clock CL-1.
12. The Y1 signal is used to develop the R1 signal which is used to reset the A-1 counter and counter 48.
13. The RT-1 signal from counter 48 falls to a low level to select the count from the A-2 counter.
14. The P=Q signal is also used to reset the Q counter which starts upcounting.
15. The next SE pulse (3 in FIG. 7) is used to clock (D CLK) the count from the A-2 counter into the comparator 70.
16. The rising count on the Q counter now approaches the count on the comparator 70.
17. The second P=Q signal from the comparator is issued when the count on the Q counter equals the count on the comparator 70.
18. The second P=Q signal is used to generate the Y2 signal and the clock CL-2 signal and to reset the Q counter.
19. The Y2 signal is used to develop the R2 signal which resets the A-2 counter and counter 50.
20. The next SE pulse (4 in FIG. 6) shuts off the count to the A-1 counter and generates the D Clk signal which clocks the count on the A-1 counter into comparator 70.
21. The third P=Q in the example being described is generated.

Notice from what has been described in the timing summary that the nominal clocks are developed from the counts which are recorded alternately on the A-1 and A-2 counters. The A-2 counter has an inverter 120, an AND gate 122, and AND gate 124 associated with it to enable the A-2 counter to function in a manner similar to that already described in relation to counter A-1. The RT-2 output from the counter 50 is not used because the high and low outputs of the B output (RT-1) of counter 48 are used by the selector 66-68 to provide the selection of the counts from the A-1 and A-2 counters, respectively.

Notice also from FIGS. 5A and 5B that the Q counter is reset upon the generation of a P=Q signal or the PD signal. The P=Q signal is used to develop the clocks CL-1 through CL-7. When the associated PD signal comes late, or after the generation of a nominal clock pulse, the PD signal is used to reset the Q counter. This means that if the document were travelling slower than the nominal speed, the count on the A-1 or A-2 counters might be 44 instead of the usual 40 which represents the nominal count in the example being described. In a situation like this, the Q counter would be reset by the P=Q signal, and it would immediately start to register a count via the M CLK and AND gate 64. After the peak associated with a P=Q signal is generated, this peak itself is used to generate a PD signal which is used to reset the Q counter. The count which was on the Q counter is "lost", and consequently, a little more time than normal will be taken by the Q counter to match the count of 44 from one of the A-1 and A-2 counters in the embodiment described. In a sense, the count which is "lost" on the Q counter represents the delay or lag in time between when the peak was nominally expected and when it actually occurred. If a peak occurs at the expected nominal time, then both the P=Q signal and the associated PD signal occur at substantially the same time. With both the P=Q and PD signals entering the OR gate 92 (FIG. 5B) at the same time, there would be only one resetting of the Q counter. Notice that the clocking signals are updated by the magnetic peaks themselves; this is a feature of this invention. Another feature is that the nominal clock or P=Q signal is updated by using the varying counts which are registered upon the A-1 and A-2 counters as the speed of the motor driving the document changes.

Another situation which needs to be discussed relates to those times in which a positive or negative peak value comes before the associated P=Q signal. When the peak value comes early, it means that the Q counter will be reset prior to upcounting to the nominal count from the A-1 or A-2 counters. This means that a normal P=Q signal would not be generated, and accordingly, the associated clock and Y signals, like CL-3 and Y3, for example, would not be generated. To provide for this situation, the early peak circuit 72, alluded to earlier herein, is utilized.

Figure 8:
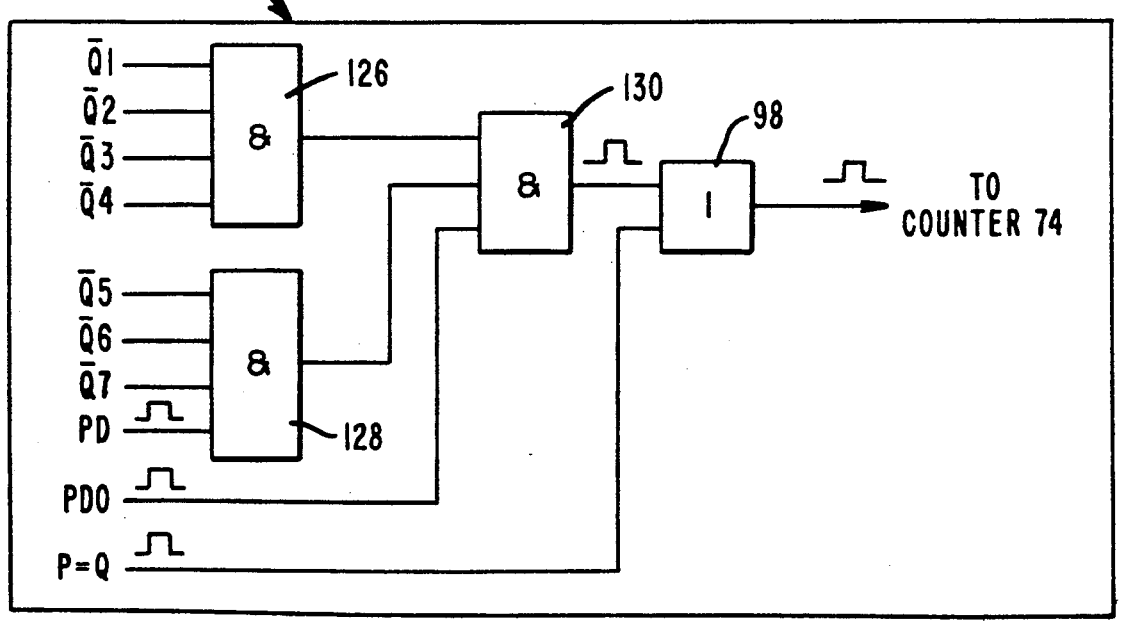
FIG. 8 is a schematic diagram showing additional details of the early peak circuit shown in FIG. 5B.

The early peak circuit 72 is shown in detail in FIG. 8, and it includes the AND gates 126, 128, and 130 and the OR gate 98 which are coupled as shown. The Q1/ through Q7/ signals shown are derived from the Q/ outputs of the one shots (like 80 shown in FIG. 4B) associated with the generation of clocks CL-1 through CL-7. The Q1/ through Q7/ outputs remain at a high level until the associated clock, like CL-1, is received. After the occurrence of the first positive going peak, the PDO signal remains at a high level for a character, and this high level conditions AND gate 130. When a peak comes early, it is fed through AND gates 128 and 130 and the OR gate 98 to produce a count on the counter 74 in the same manner as does a typical P=Q signal passing through the OR gate 98. The P=Q signal coming out of the OR gate 98 is also used to reset the Q counter as previously described.

The peak detect circuit 72, shown in FIG. 8, also provides another function in addition to the one discussed in the previous paragraph. This function is to prevent a second P=Q signal from being developed when an actual peak comes later than its associated P=Q signal. For example, if the third peak (actual) comes after the associated third P=Q signal is generated, clock CL-3, which is fed into the associated one shot, causes the Q/ output of the associated one shot to fall to a low level. This low level Q3/ stops AND gate 126 from conducting, which in turn stops AND gate 130 from conducting to thereby prevent the late PD signal which is associated with the third clock CL-3 from producing a signal which is equivalent to another P=Q signal.

Another point to be clarified relates to the delay introduced by the capacitor C1 and the resistor R1 associated with the input to the flip flop 56 (FIG. 4A) as alluded to earlier herein. This point relates to the first peak detect signal PD and the use of this signal in the early peak circuit 72 shown in FIG. 8. Basically, it is necessary to prevent the generation of an output from the early peak circuit 72 for the first positive going peak which occurs at the start of reading a character. It should be recalled that the first positive going peak occurs for all characters to be read, and it is really the second and subsequent peaks which provide for the identification of a character.

Figure 9:
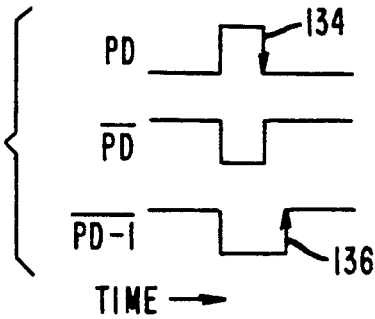
FIG. 9 shows certain waveforms associated with the portion of the circuit shown in FIG. 4A.

FIG. 9 shows the relationship of certain signals which prevent the generation of an output from the early peak circuit 72 as discussed in the previous paragraph. The PD and PD/ signals are shown along with their relationship to the PD-1/ signal which is present at the D input of the flip flop 56 (FIG. 4A). The PD-1/ signal is delayed slightly with respect to the PD/ signal. Notice that the PD signal (FIG. 9) falls at line 134 prior to the rise of the PD-1/ signal as shown by line 136. This means that the output of the AND gate 128 (FIG. 8) falls to a low level (before the PDO signal rises to a high level) to thereby shut off the AND gates 128 and 130, thereby precluding an output from the early peak circuit 72 for the first PD signal. Notice that the PDO signal shown in FIG. 8 is generated by the PD-1/ signal which is fed into the flip flop 56 shown in FIG. 4A.

Figure 10A:
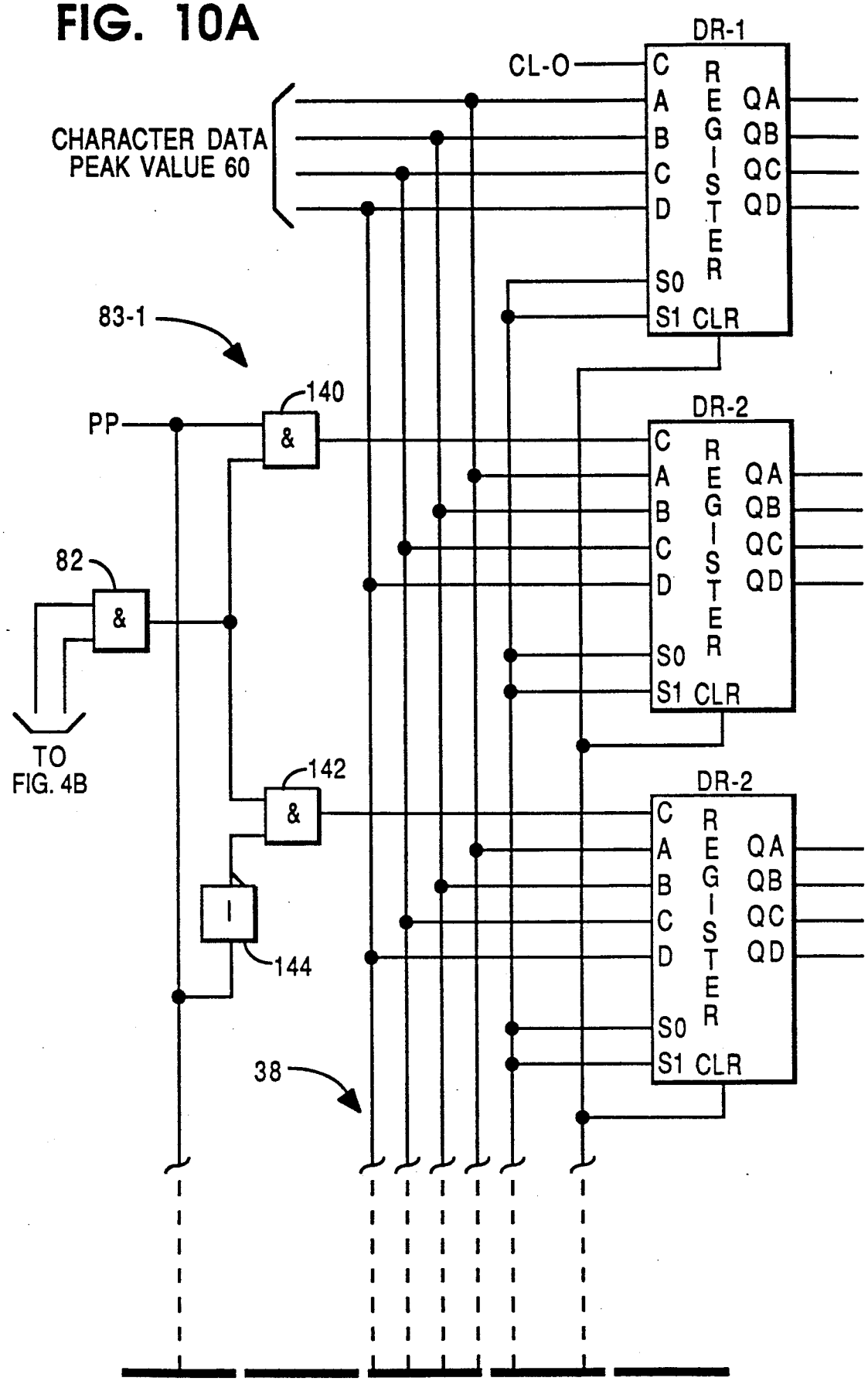
FIGS. 10A and 10B, taken together, show a portion of the circuit shown in FIG. 4B.
Figure 10B:
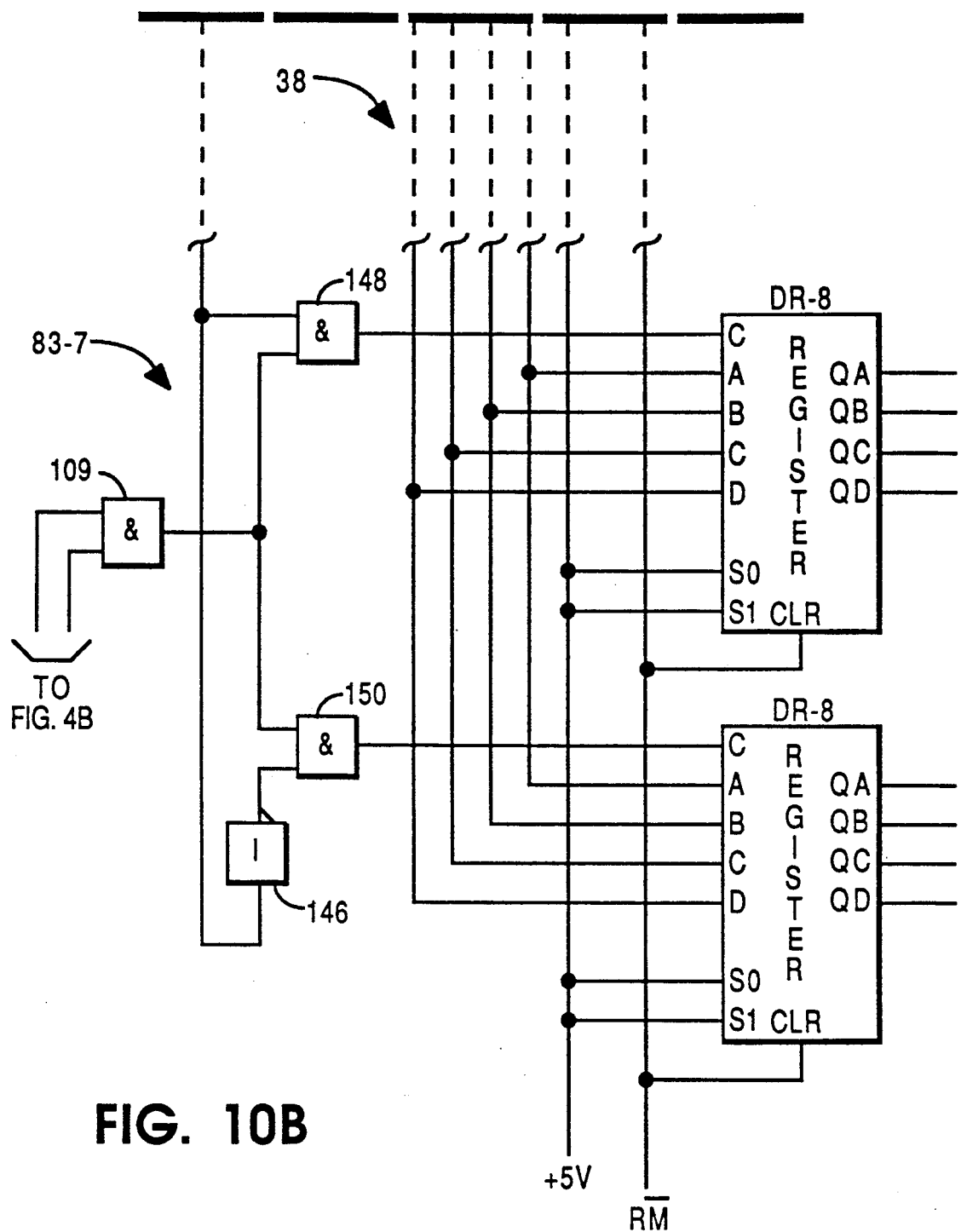

FIGS. 10A and 10B show the logic circuit 83-1 alluded to in the discussion of the portion of the circuit 24 shown in FIG. 4B. There is one such logic circuit like 83-1 provided for each of the clocks CL-1 through CL-7 shown in FIG. 4B, with logic circuit 83-1 being shown for clock CL-1 and logic circuit 83-7 being shown for clock CL-7. The function of the logic circuit 83-1, for example, is to provide the actual clocking signal which is used to clock the positive peak value, negative peak value or substantially zero peak value into the appropriate positive or negative register as generally described. Only the positive peak values are stored in the positive peak registers DR-2 through DR-8 (+VE PK) while the negative peak values and the substantially zero values are stored in the negative or no peak registers DR-2 through DR-8 (−VE PK).

Continuing with a description of FIGS. 10A, and 10B, a conventional signal sampling circuit 138 is connected to the output of the A/D converter 32 (FIG. 3) and is used to determine whether a peak is positive or negative. For example, an output PP from circuit 138 which is a binary 1 is considered a positive peak value, and an output which is a binary 0 is considered a negative peak value or a substantially zero value. Each of the AND gates, like 82 and 109 shown in FIG. 4B has its own logic circuit, like 83-1, associated with it. For example, the logic circuit 83-1 includes the AND gates 140 and 142 and the inverter 144 which are coupled as shown in FIG. 10A.

The operation of the logic circuit 83-1 shown in FIG. 10A is as follows. Because the first peak in waveform of a character being described is always a positive peak value, that value is always stored in the data register DR-1 as previously described. If the second peak value is a positive value, the output (PP) from the signal sampling circuit 138 (FIG. 3) will be a binary one. Notice from FIGS. 10A and 10B that the PP signal is fed to all the logic circuits 83-1 through 83-7. With a binary one value on the AND gate 140 in the example being described, and with a binary one coming from the output of the AND gate 82, a high level output from the AND gate 140 will clock the peak value data on the data lines 60 into the register DR-2. If, in the example being described, the first peak value after the first positive peak is a negative value or a zero value, then the PP signal will be at a low level. In this case, a low level PP signal is inverted by the inverter 144 causing a high level signal to be emitted from the AND gate 142 which was already conditioned by the high level output from the AND gate 82. A high level from the AND gate 142 clocks the negative peak value or substantially zero peak value appearing on the data lines 60.

Each of the logic circuits 83-1 through 83-7 is the same. The logic circuit 83-7 also shown in FIG. 10B has an inverter 146 and AND gates 148 and 150 which operate in the same manner as that already explained in relation to logic circuit 83-1.

What is claimed is:

1. An apparatus for use in reading MICR characters on a carrier, with each said character having a waveform which starts with a positive peak value, and with the waveforms of said characters being comprised of predetermined patterns of positive peak values, negative peak values, and substantially zero values occurring at predetermined clocking periods to identify a particular waveform as representing a particular character; said system comprising:

a MICR reader for generating said waveform when a carrier with said characters thereon is moved in reading relationship with said MICR reader;

converting means for converting a waveform from said MICR reader into said positive peak, negative peak, and substantially zero values and for placing these values on data lines associated with said converting means;

data register means coupled to said data lines for storing said positive peak, negative peak, and substantially zero values when clocked therein;

a clocking circuit for clocking said positive negative, and substantially zero values into said data register means while taking into account the speed at which the carrier on which the MICR characters are located is moving in reading relationship with the MICR reader;

said clocking circuit comprising:

first means, including a shaft encoder, for generating a first count which reflects the speed of said carrier as it is moved in reading relationship with said MICR reader, with said first count varying in accordance with the speed of said carrier as determined by said shaft encoder;

second means including an up counter for developing a nominal time period equivalent to said first count and also for generating a nominal clock signal which is used to clock a value on said data lines into said data register means; and third means coupled to said second means to shorten said nominal time period when said positive or negative peak value comes before the end of said nominal time period to generate an adjusted clock signal to clock the value on said data lines into said data register means, and also to lengthen said nominal time period when a said positive or negative peak value comes after the end of said nominal time period to generate an adjusted clock signal to clock the value on said data lines into said data register means;

said shaft encoder producing successive outputs which are related to the speed of said carrier; and said first means including first and second counters for generating said first count and also includes third and fourth counters coupled to said first and second counters, respectively, to limit the count on said first and second counters to that which occurs between successive outputs from said shaft encoder.

2. The apparatus as claimed in claim 1 in which said first means also includes a selector for alternately selecting the first counts from said first and second counters.

3. The apparatus as claimed in claim 2 in which said second means includes a comparator for receiving the first count alternately from said first and second counters and for receiving a count from said up counter and for generating said nominal clock signal when the count on said up counter equals the count on said comparator.

4. The apparatus as claimed in claim 3 in which said third means includes an early peak circuit to generate a said adjusted clock signal when a positive or negative peak value comes before the end of a nominal time period.

5. The apparatus as claimed in claim 4 in which said third means includes a reset means to reset said up counter upon the occurrence of a positive or negative peak value which follows the generation of a said nominal clock signal.